(12) United States Patent
Bansal et al.

(10) Patent No.: US 9,696,493 B2
(45) Date of Patent: Jul. 4, 2017

(54) HIGH EFFICIENCY PUMP SIGNAL COMBINER FOR HIGH POWER FIBER AMPLIFIER AND LASER APPLICATIONS

(71) Applicant: OFS Fitel, LLC, Norcross, GA (US)

(72) Inventors: Lalitkumar Bansal, Belle Mead, NJ (US); Clifford E Headley, Flemington, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/937,104

(22) Filed: Nov. 10, 2015

(65) Prior Publication Data

US 2016/0139336 A1 May 19, 2016

Related U.S. Application Data

(60) Provisional application No. 62/078,987, filed on Nov. 13, 2014.

(51) Int. Cl.
| | |
|---|---|
| *G02B 6/255* | (2006.01) |
| *G02B 6/40* | (2006.01) |
| *G02B 6/04* | (2006.01) |
| *G02B 6/245* | (2006.01) |
| *H01S 3/094* | (2006.01) |
| *C03C 25/68* | (2006.01) |
| *C03C 25/00* | (2006.01) |

(52) U.S. Cl.
CPC .......... *G02B 6/2551* (2013.01); *C03C 25/002* (2013.01); *C03C 25/005* (2013.01); *C03C 25/68* (2013.01); *G02B 6/04* (2013.01); *G02B 6/245* (2013.01); *G02B 6/2552* (2013.01); *G02B 6/40* (2013.01); *H01S 3/094053* (2013.01); *H01S 3/094057* (2013.01); *H01S 3/094069* (2013.01)

(58) Field of Classification Search
CPC .................................................. G02B 6/2551
See application file for complete search history.

(56) References Cited

U.S. PATENT DOCUMENTS

| | | |
|---|---|---|
| 4,544,234 A | 10/1985 | DeVeau, Jr. et al. |
| 4,948,412 A | 8/1990 | Yamada et al. |
| 5,638,476 A | 6/1997 | Zheng |
| 5,864,644 A | 1/1999 | DiGiovanni et al. |
| 6,139,196 A * | 10/2000 | Feth ............ G02B 6/245 385/96 |
| 6,702,481 B2 | 3/2004 | Oki et al. |

(Continued)

*Primary Examiner* — Rhonda Peace
(74) *Attorney, Agent, or Firm* — Jacobs & Kim LLP

(57) ABSTRACT

A high efficiency optical combiner minimizes core region distortions in the area where fusion splicing between an input tapered fiber bundle (or any other type of "cladding-less" input fiber) and output fiber are joined. The thickness of the output fiber's glass cladding layer in the splice region is reduced (if not removed altogether) so that a core-to-core splice is formed and any necked-down region where the glass flows to join the core regions (while also joining the outer diameters) is essentially eliminated. The reduction of distortions in the core region of the splice improves the transmission efficiency between an input tapered fiber bundle and output fiber, reaching a level of about 99%. This high efficiency optical combiner is particularly well-suited for applications where a number of pump sources are combined and applied as an input to a fiber laser or amplifier.

19 Claims, 7 Drawing Sheets

(56) References Cited

U.S. PATENT DOCUMENTS

| | | | |
|---|---|---|---|
| 6,742,939 B2 | 6/2004 | Sykora et al. | |
| 6,866,429 B2 | 3/2005 | Wang et al. | |
| 7,140,786 B2 | 11/2006 | Takayanagi et al. | |
| 8,085,464 B2 * | 12/2011 | Gonthier | G02B 6/2804 359/341.1 |
| 9,116,296 B2 * | 8/2015 | Fisher | B32B 37/12 |
| 9,213,140 B2 * | 12/2015 | Nishimura | G02B 6/4296 385/43 |
| 2002/0054740 A1 * | 5/2002 | Vakili | G02B 6/14 385/115 |
| 2004/0196537 A1 * | 10/2004 | Starodoumov | H01S 3/094003 359/341.3 |
| 2004/0240819 A1 * | 12/2004 | Shima | H01S 3/094003 385/126 |
| 2005/0207455 A1 * | 9/2005 | MacCormack | H01S 3/094003 372/6 |
| 2006/0133745 A1 | 6/2006 | Takayanagi et al. | |
| 2008/0170823 A1 * | 7/2008 | Gonthier | G02B 6/2804 385/43 |
| 2008/0187273 A1 * | 8/2008 | Clark | G02B 6/245 385/96 |
| 2010/0111118 A1 * | 5/2010 | Seo | G02B 6/2804 372/6 |
| 2011/0142402 A1 | 6/2011 | Tachikura et al. | |
| 2012/0057220 A1 * | 3/2012 | Langseth | H01S 3/0675 359/341.3 |
| 2012/0148193 A1 | 6/2012 | Sugrim et al. | |
| 2013/0319052 A1 | 12/2013 | Bansal et al. | |
| 2014/0248023 A1 * | 9/2014 | Nishimura | G02B 6/4296 385/96 |
| 2015/0049983 A1 * | 2/2015 | Fisher | B32B 37/12 385/29 |
| 2016/0139336 A1 * | 5/2016 | Bansal | G02B 6/2551 385/96 |

\* cited by examiner

HIGH EFFICIENCY PUMP SIGNAL COMBINER FOR HIGH POWER FIBER AMPLIFIER AND LASER APPLICATIONS

CROSS-REFERENCE TO RELATED APPLICATION

This application claims the benefit of U.S. Provisional Application Ser. No. 62/078,987, filed Nov. 13, 2014 and herein incorporated by reference.

TECHNICAL FIELD

The present invention relates to a fusion splice configuration for coupling a tapered fiber bundle pump source to an output fiber (forming an optical combiner) and, more particularly, to a configuration which minimizes fiber distortion at the splice point and maximizes transmission efficiency between the input and output of the combiner.

BACKGROUND OF THE INVENTION

Multimode light is an integral part of the pumping element of fiber lasers and amplifiers. A tapered fiber bundle as shown in FIG. 1 is one exemplary configuration used to combine multiple pump sources (each source providing light that is propagating along a separate fiber) into a structure that provides pump light output within a diameter of most fibers. As shown, the individual fibers (with nominal dimensions) are collected into a group that is defined as a "bundle" (a cross-section of the bundle shown in FIG. 1). The bundle is then heated and tapered so as to essentially meld into a single fiber (cross-section also shown in FIG. 1). This tapered section is capable of providing the combined pump lights as the output of the bundle.

In use, a separate optical fiber is typically spliced to the endface of the taper and used to deliver the total, combined pump signal to an associated optical fiber amplifier or laser. The configuration of the tapered fiber bundle and the output fiber is often referred to as a "pump combiner", or simply a "combiner". The output fiber has both core and cladding, where in some cases the cladding comprises glass.

As a matter of course, there is always a desire to increase the transmission efficiency of the light propagating through this type of combiner from the tapered bundle to the output fiber (or, more generally, from any type of "cladding-less" fiber to a cladded optical fiber). Indeed, higher transmission efficiency improves the overall system efficiency and also reduces the power requirements associate with high power fiber lasers and amplifiers (e.g., greater than 2 kW). Also, higher pump transmission efficiency reduces the loss component of the system, since the light energy associated with transmission loss is converted to heat and reduces system reliability. Hence, higher multimode transmission efficiency is desirable.

The power threshold for nonlinear effects in fiber lasers and amplifiers is inversely proportional to the fiber length. The required gain length is itself proportional to the cladding area of the doped fiber. In order to minimize nonlinearities, the smallest possible cladding diameter is desirable. On the other hand, the amount of pump power that can be coupled into the gain fiber is proportional to its cladding area; thus, a large cladding area is desirable for this reason. Since the numeral aperture (NA) of the light that can propagate through a tapered fiber bundle increases with taper ratio, the NA at the output of the taper should not exceed the NA of the output fiber (important in order to achieve low loss). This condition is established by a "brightness" condition for tapered bundles of multimode fibers defined as follows:

$$D_{out}^2 NA_{out}^2 \geq n \sim D_{in}^2 NA_{in}^2,$$

where $D_{out}$ is the diameter of the output fiber, $NA_{out}$ is the numerical aperture of the output fiber, "n" is the number of fibers in the bundle, $D_{in}$ is the diameter of a pump input fiber and $NA_{in}$ is the numerical aperture of the pump input fiber.

The limitations of available pump diode brightness do not allow for efficient pumping of small diameter gain fibers, due to the higher taper ratio required for use with the smaller gain fiber. A high taper ratio increases the NA of light and, therefore, decreases brightness and increases pump losses (decreasing the maximum power available at the output of the combiner).

SUMMARY OF THE INVENTION

The needs remaining in the prior art are addressed by the present invention, which relates to a fusion splice configuration for coupling a tapered fiber bundle pump source to a glass-clad output fiber and, more particularly, to a configuration which minimizes fiber distortion at the splice point and maximizes transmission efficiency between the input and output of the combiner.

In accordance with the present invention, at least a portion of the glass cladding at an end termination of an output fiber is removed (preferably, most or all of the cladding in this area is removed) no as to create a configuration where core-to-core fusion is performed between the tapered fiber bundle and the output fiber. A direct core-to-core fusion process reduces the influence of cladding material on the fusion splice and minimizes distortions in the core region at the splice point. A multimode transmission efficiency on the order of 99% may be achieved by using a direct core-to-core splice in this type of combiner.

The glass cladding along a terminal portion of the output fiber can be removed using any suitable technique including, but not limited to, etching (chemical removal), polishing (mechanical removal), and melting (thermal removal).

In one particular embodiment of the present invention, an additional portion of cladding may be removed at a further distance from the output fiber end termination, where this additional area of core exposure allows for any remaining pump light propagating within the cladding to be scattered (or refracted) out of the output fiber.

An exemplary high power system formed using a plurality of high efficiency combiners of the present invention may take the form of a tree architecture, with cascaded groups of pump combiners used to generate pump light that can be combined along at least two different levels within the hierarchy and provide pump output power over 2 kW.

An exemplary embodiment of the present invention takes the form of an optical combiner including an optical input arrangement comprising a tapered fiber bundle formed to exhibit an endface having a diameter $D_{in}$ and an optical output fiber defined as including a terminal portion for coupling to the endface of the optical input arrangement. The output fiber includes a core region and at least one cladding layer surrounding the core region, wherein the core region exhibits a diameter $D_{out}$ substantially equal to the endface of the tapered fiber bundle (defined as $D_{in}$). At least some of the cladding layer material is removed along a longitudinal extent of the output fiber, beginning at the terminal portion, so as to enable core-to-core fusion splicing between the optical input arrangement and the optical output fiber, reducing core distortion at the splice point and creating a high efficiency fusion splice combiner.

Another embodiment of the present invention takes the form of a method of creating a high efficiency optical combiner and includes the steps of: (1) providing an optical input arrangement comprising a plurality of optical fibers configured as a tapered fiber bundle formed to exhibit an endface having a diameter $D_{in}$; (2) providing an optical output fiber having a core region and at least one surrounding glass cladding layer, where the core region exhibits a diameter $D_{out}$ substantially equal to the endface $D_{in}$ of the optical input arrangement; (3) removing at least a portion of the thickness of the glass cladding layer along a defined longitudinal extent L of the output fiber, beginning at the endface thereof; (4) joining the endface of the optical input arrangement to the endface of the optical output fiber and (5) heating the joined portions of the optical input arrangement and the optical output fiber so as induce glass flow and create core-to-core fusion splicing between the optical input arrangement and the optical output fiber, reducing core distortion at the splice point and forming a high efficiency optical combiner.

The present invention may also take the form of a cascaded optical combiner arrangement comprising: (1) an input stage having a set of high efficiency optical combiners, each high efficiency optical combiner including an optical input arrangement comprising a plurality of optical fibers configured as a tapered fiber bundle, formed to exhibit an endface having a diameter $D_{in}$ and an optical output fiber defined as including a terminal portion for coupling to the endface of the optical input arrangement, the output fiber including a core region and at least one glass cladding layer surrounding the core region, wherein the core region exhibits a diameter $D_{out}$ substantially equal to the endface diameter $D_{in}$ of the tapered fiber bundle, with at least a defined thickness of the glass cladding material removed along a longitudinal extent L of the output fiber, beginning at the terminal portion, so as to enable core-to-core fusion splicing between the optical input arrangement and the optical output fiber, reducing core distortion at the splice point and creating a high efficiency fusion splice combiner; and (2) an output optical combiner, the set of optical output fibers from the input stage applied as inputs to the output optical combiner and configured as a trunk tapered fiber bundle, the output optical combiner further comprising a system output fiber including a core region and a polymer cladding layer surrounding the core region, with the endface of the trunk tapered fiber bundle fusion spliced to the system output fiber.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

In many conventional arrangements of pump combiners, it is necessary to splice fibers having dissimilar physical dimensions (specifically, different outer diameters). To maximize multimode transmission efficiency while retaining brightness at splice points ("brightness", as defined above, is a measure of pump power carried within a cross-sectional area at a certain numerical aperture), the light-carrying core diameters should match, regardless of the diameters of the remaining cladding layers on both fibers. Typical output fibers include at least one glass cladding layer (or layers) surrounding the core region, whereas the output portion of a tapered fiber bundle can be thought of as primarily a "core" region, with little or no cladding layer sufficient to provide confinement (and may therefore be characterized as a "cladding-less" optical fiber).

Figure 2:
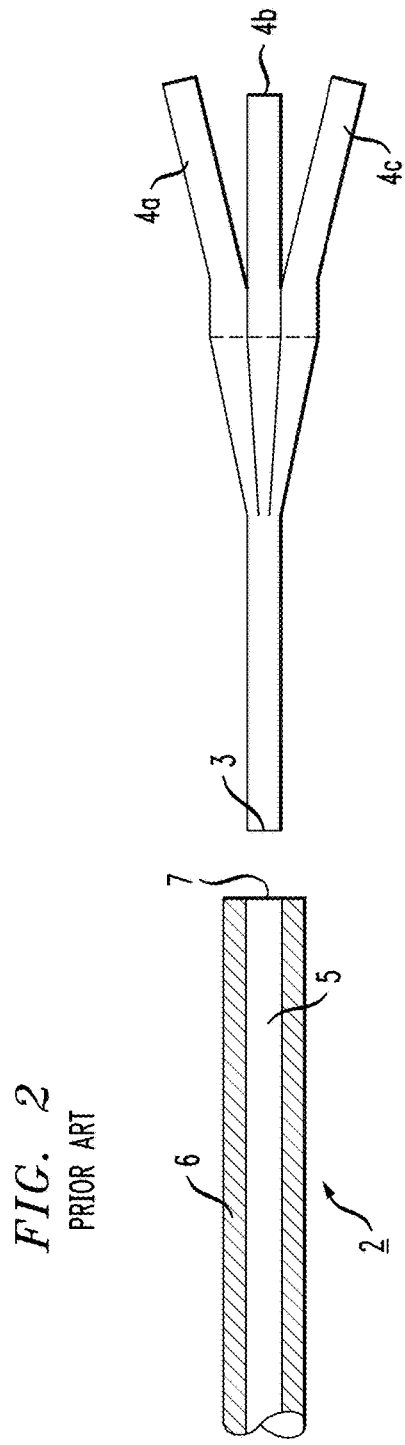
FIG. 2 shows a conventional splice connection between the prior art tapered fiber bundle of FIG. 1 and a conventional multimode output fiber.

FIG. 2 illustrates a conventional prior art tapered fiber bundle 1 and an associated output fiber 2. As mentioned above, an endface 3 of tapered fiber bundle 1 can be thought of as a combination of the core regions of the various fibers 4a, 4b, . . . , used to supply pump light to the system (more correctly, fibers 4 have both core and cladding, but within the taper region the light escapes the core and is guided by both core and cladding at output endface 3). The tapering process is used to create endface 3 with a diameter that essentially matches the diameter of core region 5 of output fiber 2 (in order to maximize transmission efficiency). As shown, output fiber 2 includes a relatively thick cladding layer 6, which is necessary in order to provide the desired numerical aperture (NA), as well as to confine the continued transmission of the pump light within core region 5 of output fiber 2.

Figure 3:
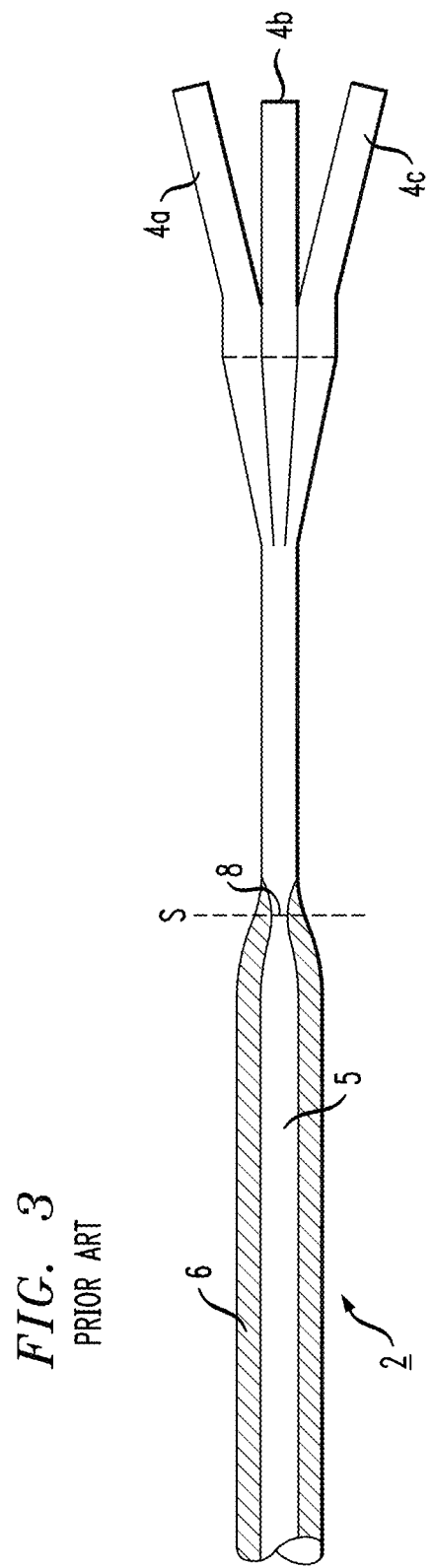
FIG. 3 depicts the "necked down" region created at the interface between the fiber bundle and output fiber of FIG. 2 during a fusion splicing process, the necked-down region resulting in a distortion of the core region at this point (reducing transmission efficiency between the fiber bundle and the output fiber)
Figure 4:
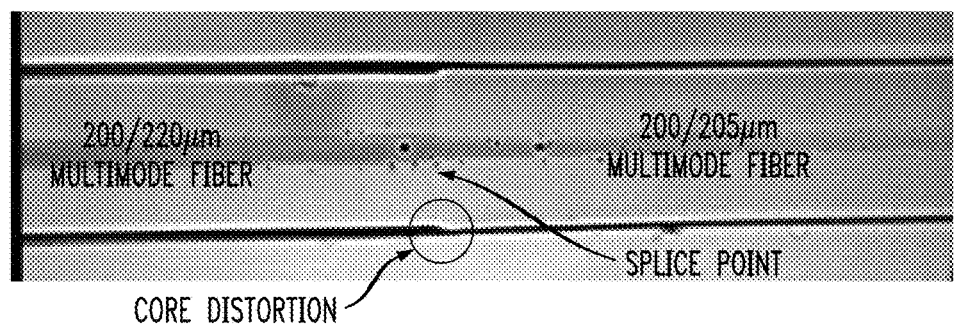
FIG. 4 is an optical micrograph illustrating an exemplary core distortion created from fusing a conventional 200/220 µm multimode output fiber to a 200/205 µm input fiber.

Thus, when attempting to fusion splice endface 3 of tapered fiber bundle 1 to an endface 7 of output fiber 2, there is necessarily a mis-match in glass cladding diameter and the resulting surface tension causes axial flow of the hot glass, creating in a smooth outer surface within the fusion region. As shown in FIG. 3, this hot glass flow results in creating a necked-down region 8 within an area of core region 5 that fuses with tapered fiber bundle 1. Indeed, surface tension dictates that the outer diameter of fiber 2 flow and conform to match the outer diameter of tapered fiber bundle 1. At the same time, the material of tapered bundle 1 flows to meet the diameter of output fiber 2. The core distortion at splice point S occurs to conserve the additional mass of the larger-diameter fiber (in this case, output fiber 2). FIG. 4 is an optical micrograph illustrating this core distortion, which is significant even though the difference in diameter between the bundle and output fiber is only about 15 μm.

Figure 5:
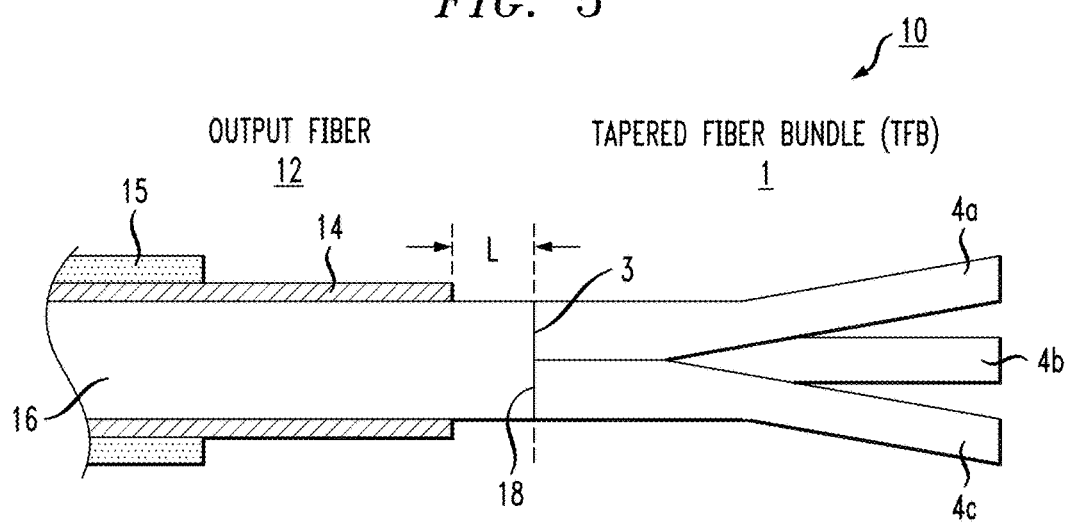
FIG. 5 illustrates an exemplary pump light combiner formed in accordance with the present invention to provide core-to-core fusing between the fiber bundle and a multimode output fiber, where the multimode fiber cladding in the proximity of the splice is removed to reduce core distortion at the splice point and allow for high transmission efficiency through the core region at this splice point.

FIG. 5 illustrates an exemplary combiner 10, formed in accordance with the present invention, that overcomes the problems associated with core distortion and reduced transmission efficiency described above. Referring to FIG. 5, it is shown that the physical properties of the tapered fiber bundle remain the same as described above (and, therefore, carry the same reference numerals). In contrast to the prior art arrangement described above, combiner 10 utilizes an output fiber 12 that is processed so that most (if not all) of its cladding layer 14 is removed along a longitudinal extent L in proximity to the fusion splice location. This portion of cladding layer 14 is removed prior to performing the fusion splicing process, using any suitable method well known in the art. For example, removal of a selected portion of cladding layer 14 may be performed by etching a terminal portion of output fiber 12 in an appropriate etchant solution (such as HF or KOH) in a chemical-based removal process, by polishing the terminal portion of output fiber 12 to remove the cladding material using a mechanical (grinding) type of process, or by heating the terminal portion of output fiber 12 to vaporize at least some of the cladding (a thermal process). Output fiber 12 is shown as also including an outer jacket layer 15, which may take the form of a low index material.

Tapered fiber bundle 1 is formed in any suitable, conventional manner and processed to exhibit a diameter at endface 3 that matches, as close as possible, the diameter of core region 16 at endface 18 of output fiber 12. Thus, upon performing fusion splicing of exposed core region 16 of output fiber 12 to endface 3 of bundle 1, there will be significantly less deformation of joined cores (compared to the prior art), since the diameters of core region 16 and endface 3 are formed to match as closely as possible (i.e., create a core-to-core splicing configuration). Inasmuch as cladding layer 14 has been removed from the terminal portion of output fiber 12, when the glass flows during the high temperature fusion splicing process, the surface tension will be minimal and the outer boundaries of core region 16 and bundle 1 will experience little or no of the "neck-down" profile found in prior art mis-matched fusion splices (shown as region 8 in prior art FIG. 3).

Figure 6:
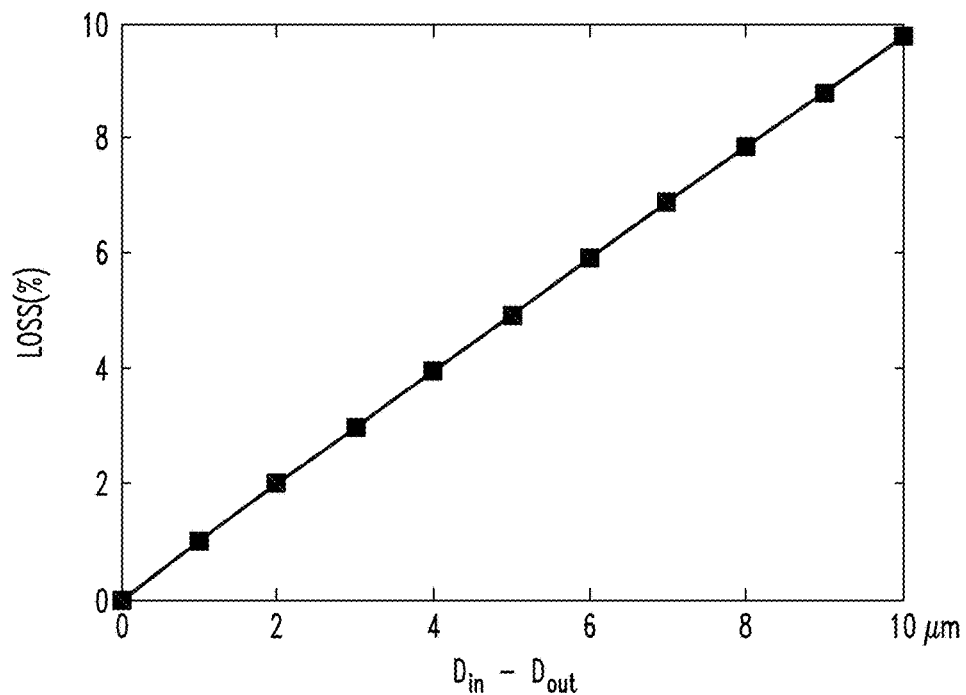
FIG. 6 is a plot of percentage loss in transmission efficiency as a function of difference in diameter being a pump combiner input fiber structure and an output fiber.

In accordance with the present invention, cladding layer 14 of output fiber 12 is removed (or at least significantly reduced in thickness) to minimize multimode coupling loss, creating a configuration where the outer diameter difference between endface 3 of bundle 1 and endface 18 of output fiber 12 is preferably less than 2 μm. This mis-match is sufficient to yield a percentage loss below 2%, as shown in the below equation that defines loss:

$$loss\ (\%) = \frac{(D_{in}^2 - D_{out}^2)}{D_{in}^2},$$

where $D_{in}$ is the diameter of endface 3 of fiber bundle 1 (see FIG. 2) and $D_{out}$ is the diameter of endface 18 of output fiber 12. FIG. 6 is plot of this percentage loss value as a function of increasing difference in core diameters between these two fibers.

Figure 7:
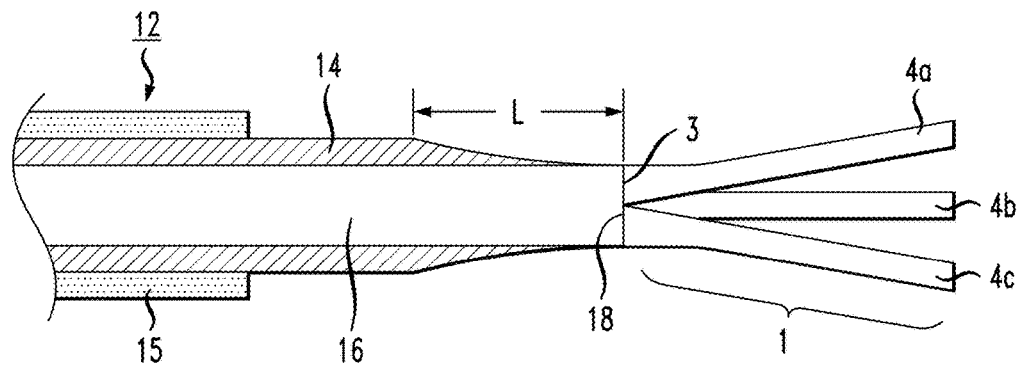
FIG. 7 shows an alternative to the arrangement of FIG. 5, where in this case the output fiber cladding is tapered (instead of being completely removed) along the area in proximity to the splice.

In the embodiment shown in FIG. 5, essentially all of the cladding material along longitudinal extent L at the terminal portion of output fiber 12 has been removed. This type of cladding removal may be achieved by using a proper chemical etchant that will preferentially remove the cladding material without harming the underlying core material. In another embodiment, as shown in FIG. 7, the thickness of cladding layer 14 is gradually reduced along longitudinal extent L, reaching a minimal thickness at endface 18 of output fiber 12. The reduction in thickness may be sufficiently gradual such that an adiabatic transition for pump light in the cladding is created.

In further accordance with the present invention, cladding layer 14 should be removed over a sufficient longitudinal extent L to avoid core distortion within the hot zone of the splice. In using arc-based fusion splicers, the value of L may be as great as 3 mm, although it may be shorter if the cladding thickness is tapered in the manner shown in FIG. 7. In accordance with the teachings of the present invention, it is important that core distortion associated with glass flow be avoided. As mentioned above, glass flow is induced by surface tension properties of the two molten fibers and their affinity to join along their outer diameters and core region boundaries. Core distortion is thus minimized by a combination of small, discrete diameter mis-match between the two fibers and a sufficiently gradual diameter taper.

It is to be understood that output fiber 12 may take the form of a various number of different types of fibers, depending on the requirements of the system. Additionally, the tapered fiber bundle may comprise a plurality of multi-mode fibers with or without a central single mode signal fiber, or a group of single mode fibers used to support the propagation of pump light. Even in situations where the tapered fiber bundle comprises a set of single mode fibers, it is to be understood that the combined output pump light will be multimode in form. Output fiber 12 may have a doped core region (either up-doped or down-doped) for guiding purposes, or doped with a rare earth element to form a gain-producing configuration.

Figure 8:
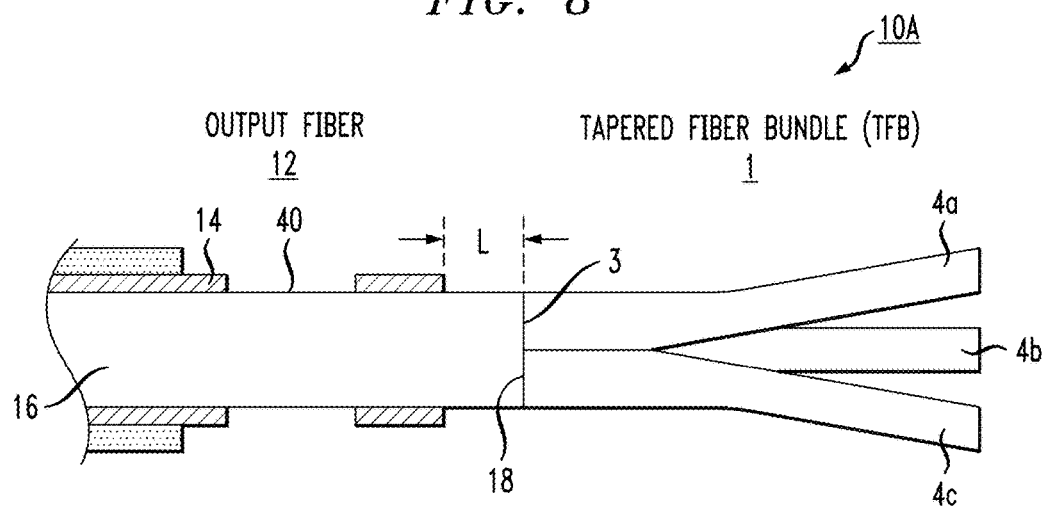
FIG. 8 illustrates an alternative embodiment of the present invention, where an additional window is opened along the output fiber cladding layer, the additional window used to scatter any remaining light propagating within the cladding layer away from the core region of the output fiber.

FIG. 8 illustrates an alternative embodiment of the present invention, in this case a high efficiency optical combiner 10A formed to further reduce the presence of stray pump light propagating along cladding layer 14 of output fiber 12. In this embodiment, cladding layer 14 is formed to include one or more etched regions 40 at locations removed from the splice region. The presence of these regions where the cladding has been removed interrupts the propagation of light in cladding layer 14 and will instead scatter (refract) any light away from output fiber 12. For this purpose, the transition across region 40 should be non-adiabatic (i.e., abrupt) for the light propagating in the cladding, without causing undue scattering or mode coupling for the (wanted) pump light that is propagating along the core region.

Experiments were performed to measure the transmission efficiency of the optical combiner of the present invention by fabricating a 7-to-1 multimode combiner from a set of fibers that each exhibit a numerical aperture (NA) of 0.15, a core diameter of 105 μm and outer diameter of 125 μm. The seven individual fibers were processed to form a tapered fiber bundle, the output endface of the bundle having a diameter of about 200 μm. The endface of the tapered fiber bundle was then fusion spliced to a multimode output fiber (0.22 NA) having a core diameter of 200 μm and an outer diameter of 220 μm (i.e., a cladding thickness of 10 μm). In accordance with the present invention, the cladding at a terminal portion of the multimode output fiber was minimized to improve the coupling to the tapered fiber bundle. In this particular experiment, the cladding was reduced from 10 μm to about 1.5 μm by etching in an HF solution.

Figure 9:
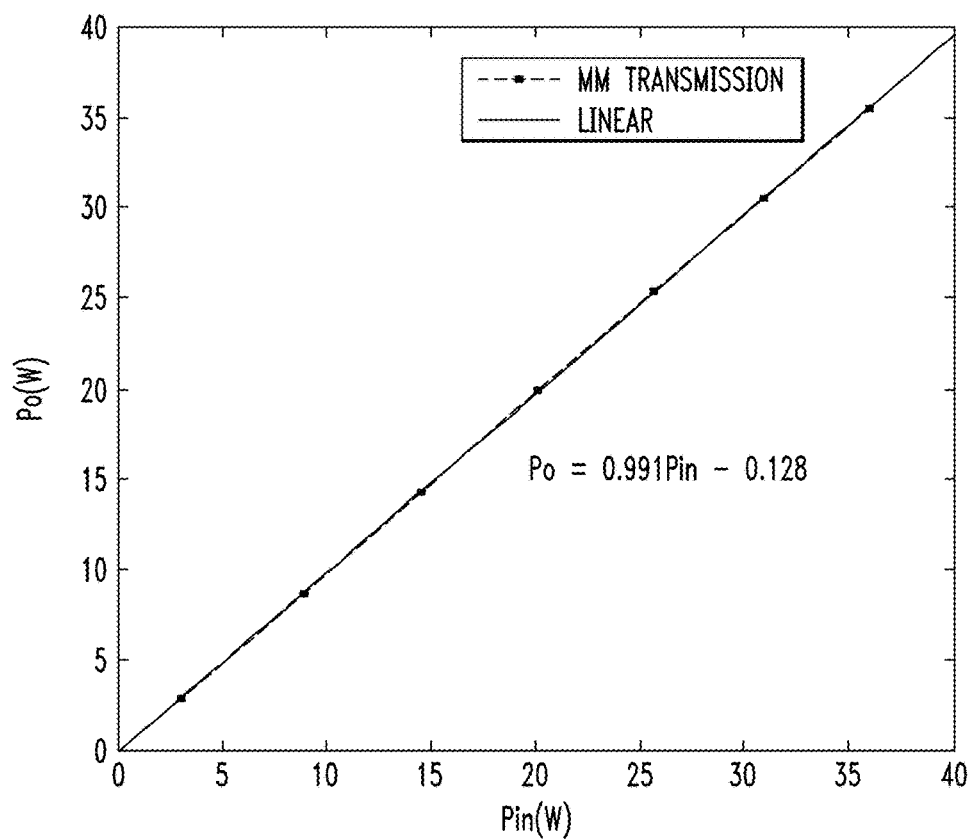
FIG. 9 is a graph of transmission efficiency for a 7-1 pump signal combiner formed in accordance with the present invention.

FIG. 9 is a graph of the transmission characteristics of an inventive combiner formed as outlined above. As shown, FIG. 9 is a plot of output power along the multimode output fiber as a function of the power of the pump light coupled into the tapered fiber bundle. In this case, the formation of a 7-1 high efficiency optical combiner formed in accordance with the present invention was found to exhibit a transmission efficiency of 99%. This value compares favorably to a conventional prior art 7-1 combiner that exhibits an efficiency of about 97%.

Figure 10:
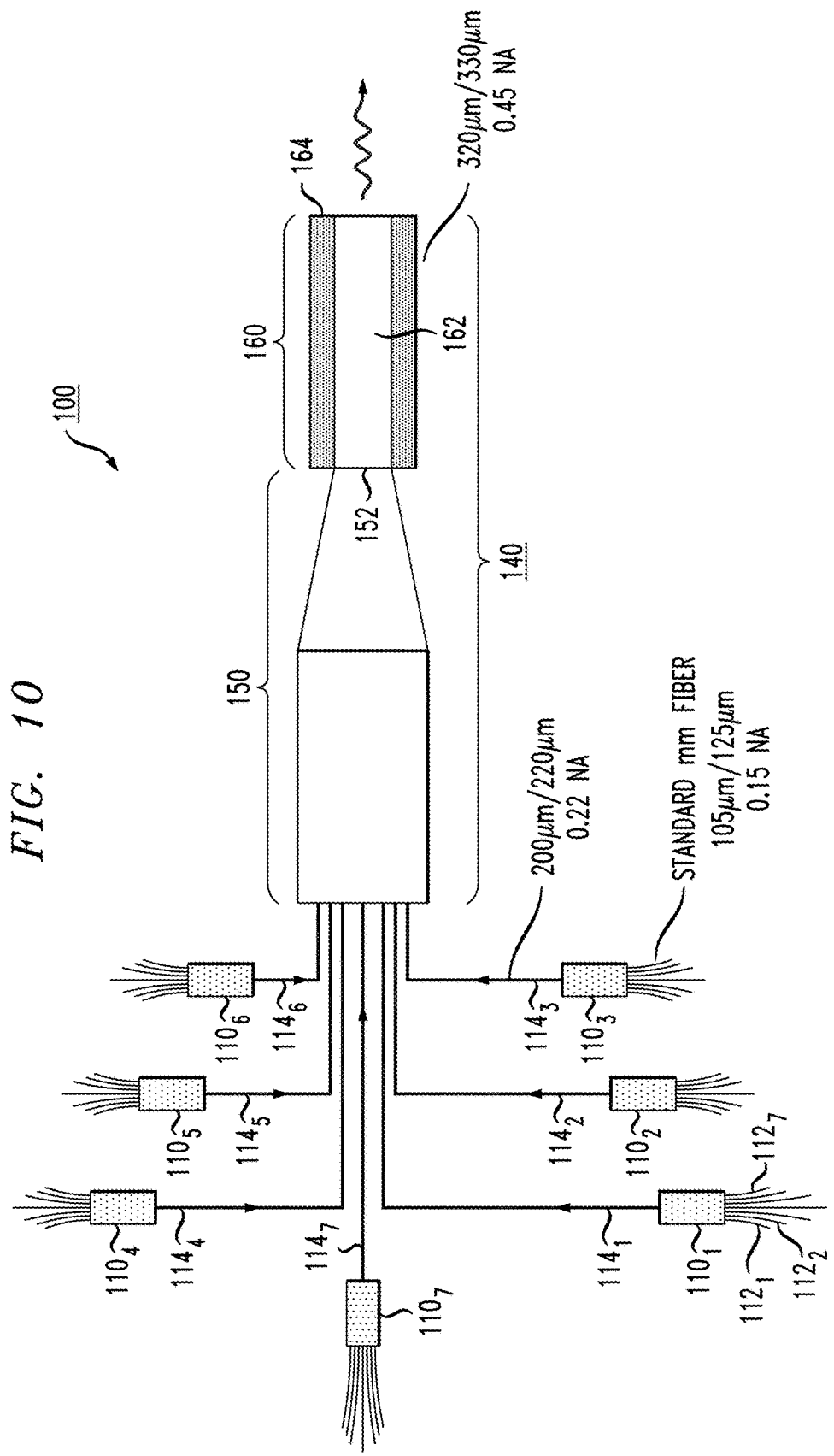
FIG. 10 is a simplified diagram of an exemplary high power, high efficiency pump signal source formed using a cascaded number of inventive pump combiners disposed in a tree architecture.

This ability to achieve a transmission efficiency of 99% can be leveraged to form larger systems of cascaded combiners that are able to deliver pump powers in excess of 2 kW. FIG. 10 illustrates an exemplary tree architecture formed of a plurality of high efficiency combiners of the present invention, in this case arranged in a manner that allows for an overall system transmission efficiency of 95% to be achieved.

Figure 1:
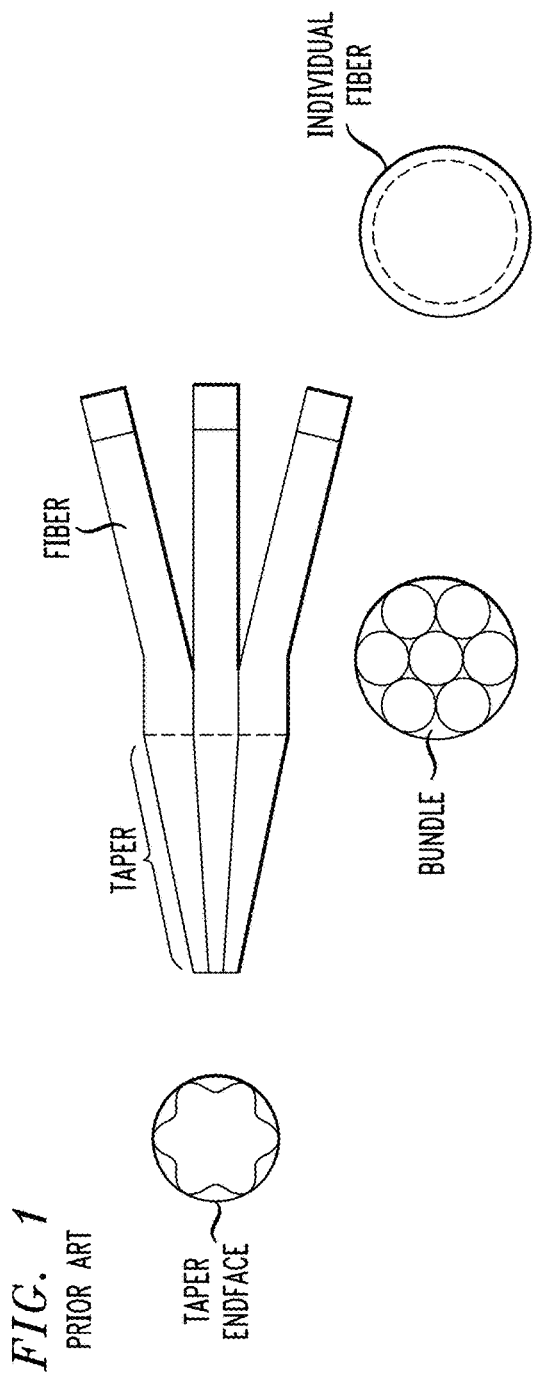
FIG. 1 illustrates a conventional prior art tapered fiber bundle useful for combining a plurality of pump input sources into a single, higher-power pump light output.

A cascaded pump combiner system 100 as shown in FIG. 10 includes an input stage of a plurality of high-efficiency optical combiners 110 formed in accordance with the present invention. In this particular embodiment, a set of seven such combiners $110_1, 110_2, \ldots, 110_7$ is used (to maintain the "closely-packed" type of bundle as shown in FIG. 1). Each combiner 110 is itself shown as having a set of seven separate pump inputs, propagating along a set of seven separate input fibers (shown as fibers $112_1, 112_2, 112_7$ with combiner $110_1$). The pump fibers are bundled and tapered, with the endface of the tapered bundle fusion spliced to an associated output fiber $114_1$, in the manner described above (i.e., with a portion of the output fiber cladding removed to minimize core distortion and improve the core-to-core fusion splice transmission efficiency). As discussed above, a high efficiency combiner 110, formed in this manner, exhibits a transmission efficiency of 99% (this efficiency is provided in accordance with the present invention by minimizing the thickness of the cladding layer on output fiber 114 in the vicinity of the fusion splice).

At the next level in the cascaded configuration of FIG. 10, the set of seven output fibers $114_1\text{-}114_7$ from combiners $110_1\text{-}110_7$ are applied as separate inputs to a trunk combiner 140 formed to include a tapered fiber bundle 150 and a system output fiber 160. The output fibers 114 are bundled and tapered (in a similar manner) so that all of the pump light coupled into the system will exit tapered fiber bundle 150 along its output endface 152.

To complete the architecture, a system output fiber 160 is fusion spliced to output endface 152 of trunk bundle 150. At this point along the signal path, the combined pump light exiting endface 152 has a relatively large NA (about 0.45), so system output fiber 160 necessarily also exhibits a relatively large NA. Since a fiber having a polymer cladding is preferred in this instance (and glass cladding cannot provide a numerical aperture of this size), there is no need to remove any of polymer cladding 164 of system output fiber 160 when providing fusion splicing of endface 152 to a core region 162 of system output fiber 160.

Figure 11:
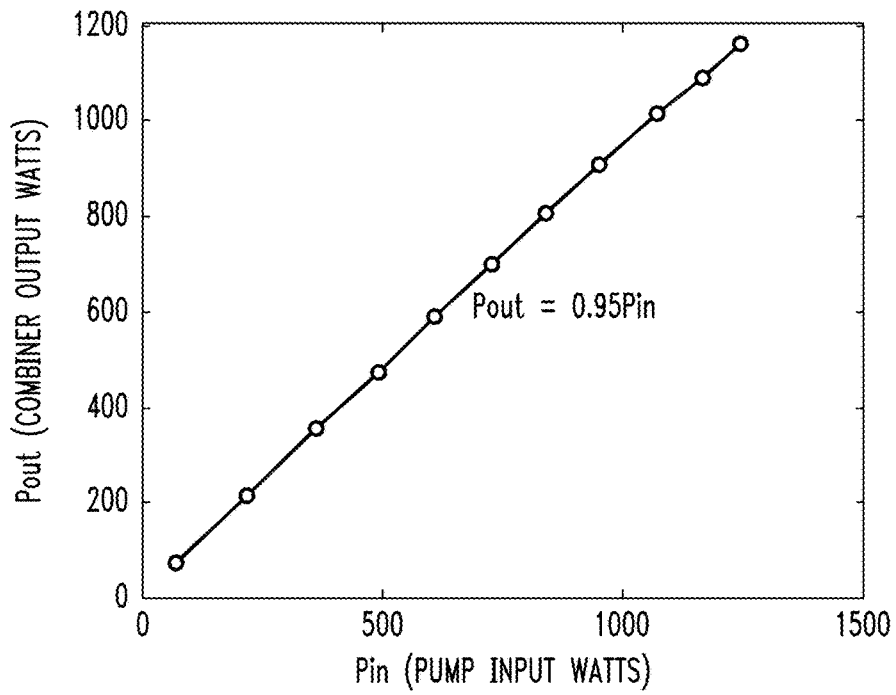
FIG. 11 is a graph of the transmission efficiency of the tree architecture configuration of FIG. 10.

In this particular configuration as shown in FIG. 10, a transmission efficiency on the order of about 96% is created by between trunk bundle 150 and system output fiber 160 forming trunk combiner 140. When combined with the 99% transmission efficiency for input stage combiners 110, an overall system transmission efficiency of 95% is found. This result compares favorably with conventional systems that provide 92% efficiency. FIG. 11 is a plot of transmission efficiency for cascaded tree architecture configuration of FIG. 10.

One particular configuration of the tree architecture shown in FIG. 10 utilizes conventional multimode fibers having dimensions 105 μm/125 μm with an NA of about 0.15 as the input fibers 112 for each combiner 110. These multimode fibers 112 are bundled and tapered down to endface having a diameter of about 200 μm. Recall that all of the pump light signals are combined at this endface, creating a relatively high-power (high brightness) pump light output. The output fibers 114 were selected to be a 200 μm/220 μm multimode fiber, with most of the 10 μm cladding removed in the end region in the vicinity of the splice.

Within trunk bundle 150, the collection of output fibers 114 were gathered and were drawn down into a taper having an endface diameter of about 330 μm, allowing for endface 152 to be efficiently coupled to a system output fiber 160 having a diameter of 330 μm and a 0.46 NA.

Figure 12:
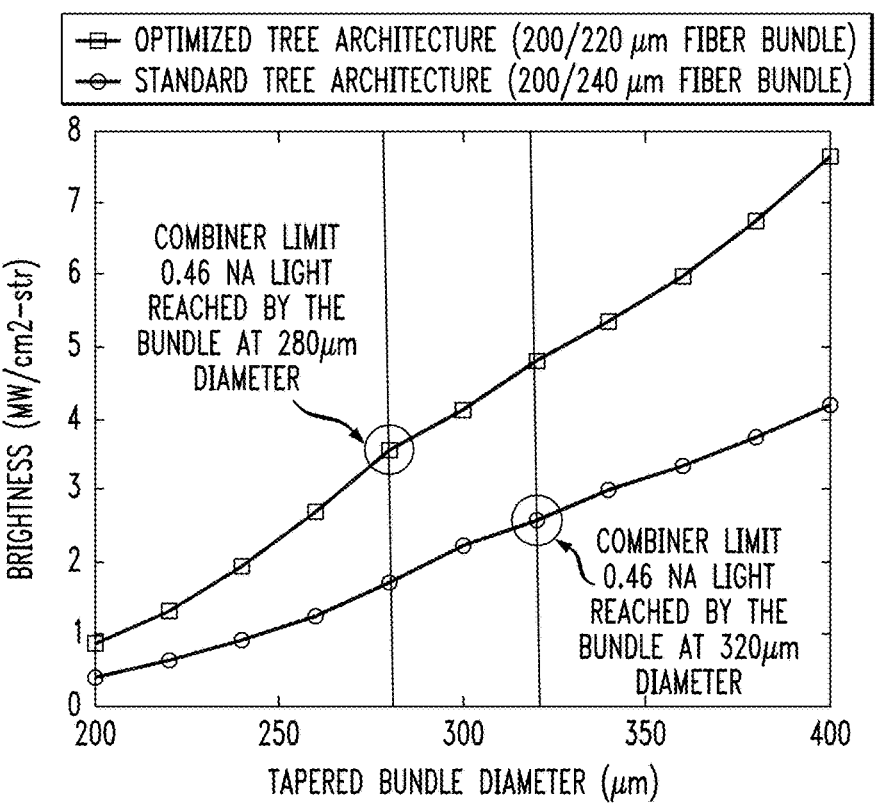
FIG. 12 is a plot comparing the brightness associated with a conventional tree architecture combiner arrangement and the inventive high power, high efficiency system of FIG. 10.

The system as shown in FIG. 10 also provides a "brightness" advantage over tree architectures formed using conventional combiners. FIG. 12 is a comparison of the brightness achieved with the high efficiency arrangement of FIG. 10 compared to the conventional design. The brightness calculations show that for a system output fiber having a diameter of 400 μm, a brightness on the order of 7.66 MW/cm$^2$-str is achieved. This is in comparison to a brightness of about 4.19 MW/cm$^2$-str of a conventional arrangement; essentially, a doubling of the brightness by using the high efficiency combiners of the present invention. The improvement in brightness can be attributed to the ability to use a smaller diameter fiber (220 μm vs. 240 μm) at each combiner output (i.e., output fibers 114), and therefore a smaller taper ratio is required at the system output fiber (so that the final NA of the pump light is smaller than in the conventional prior art designs).

While the above discussion describes coupling between a tapered pump combiner and an output fiber, the scope of the present invention is not so limited and is contemplated as appropriate for use in any configuration where there is a need to fusion splice a "cladding-less" fiber to a fiber having both core and cladding. In these cases there will indeed be a mis-match in either core or cladding diameter (or both) at the splice, and the inventive concept of minimizing the thickness of the cladding layer to minimize distortions in at the location of the splice is considered to be useful. Thus, the present invention may be generalized to a fusion splice between any such combination of fibers.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the claims which follow.

What is claimed is:

1. An optical combiner comprising
an optical input arrangement comprising a plurality of optical fibers configured as a tapered fiber bundle, formed to exhibit an endface having a diameter $D_{in}$; and
an optical output fiber defined as including a terminal portion for coupling to the endface of the optical input arrangement, the output fiber including a core region and at least one glass cladding layer surrounding the core region, wherein the core region exhibits a diameter $D_{out}$ substantially equal to the endface diameter $D_{in}$ of the tapered fiber bundle, with at least a defined thickness of the glass cladding material removed along a longitudinal extent L of the output fiber, beginning at the terminal portion, so as to enable core-to-core fusion splicing between the optical input arrangement and the optical output fiber, reducing core distortion at the splice point and creating a high efficiency fusion splice combiner, the thickness of the glass cladding material gradually reduced along the defined longitudinal extent L while extending to the endface of the output fiber.

2. The optical combiner as defined in claim 1 wherein the optical input arrangement comprises a tapered fiber bundle of multimode fibers.

3. The optical combiner as defined in claim 2 wherein the tapered fiber bundle supports the propagation of a plurality of separate pump inputs to the optical combiner and the output fiber directs a combined pump output signal to another optical component.

4. The optical combiner as defined in claim 3 wherein a transmission efficiency between the endface of the optical input arrangement and the core region of the optical output fiber is about 99%.

5. The optical combiner as defined in claim 1 wherein the optical input arrangement comprises a tapered fiber bundle supporting the propagation of a plurality of single mode input optical signals.

6. The optical combiner as defined in claim 1 wherein the optical input arrangement comprises at least one single mode fiber and a plurality of multimode fibers.

7. The optical combiner as defined in claim 1 wherein the glass cladding material is removed from the defined longitudinal extent L using a chemical etching process.

8. The optical combiner as defined in claim 1 wherein the glass cladding material is removed from the defined longitudinal extent L using a mechanical polishing process.

9. The optical combiner as defined in claim 1 wherein the glass cladding material is removed from the defined longitudinal extent L using a plasma vaporization process.

10. The optical combiner as defined in claim 1 wherein an additional portion of the glass cladding material is removed from a separate, spaced-apart region of the output fiber so as to disrupt the propagation of light along the cladding layer.

11. The optical combiner as defined in claim 1 wherein the output fiber further comprises a low index jacket region surrounding the glass cladding layer.

12. A method of creating a high efficiency optical combiner, including providing an optical input arrangement comprising a plurality of optical fibers configured as a tapered fiber bundle formed to exhibit an endface having a diameter $D_{in}$;
providing an optical output fiber having a core region and at least one surrounding glass cladding layer, where the core region exhibits a diameter $D_{out}$ substantially equal to the endface $D_{in}$ of the optical input arrangement;
gradually reducing the thickness of the glass cladding layer along a defined longitudinal extent L of the output fiber while extending to the endface thereof;
joining the endface of the optical input arrangement to the endface of the optical output fiber; and
heating the joined portions of the optical input arrangement and the optical output fiber so as induce glass flow and create core-to-core fusion splicing between the optical input arrangement and the optical output fiber, reducing core distortion at the splice point and forming a high efficiency optical combiner.

13. The method as defined in claim 12, wherein the step of gradually reducing the thickness of the glass cladding layer uses an etching process.

14. The method as defined in claim 13, wherein HF or KOH is used as the etchant.

15. The method as defined in claim 12, wherein the step of gradually reducing the thickness of the glass cladding layer uses a polishing process to mechanically remove the glass cladding material.

16. The method as defined in claim 12, wherein the step of gradually reducing the thickness of the glass cladding layer uses a vaporization process to thermally remove the glass cladding material.

17. The method as defined in claim 12 wherein the method further includes the step of removing a selected portion of the glass cladding material at a separate, spaced apart location along the output fiber, creating a disruption along the cladding layer for scattering unwanted light propagating along the cladding layer.

18. A cascaded optical combiner arrangement comprising
an input stage having a set of high efficiency optical combiners, each high efficiency optical combiner including
an optical input arrangement comprising a plurality of optical fibers configured as a tapered fiber bundle, formed to exhibit an endface having a diameter $D_{in}$; and
an optical output fiber defined as including a terminal portion for coupling to the endface of the optical input arrangement, the output fiber including a core region and at least one glass cladding layer surrounding the core region, wherein the core region exhibits a diameter $D_{out}$ substantially equal to the endface diameter $D_{in}$ of the tapered fiber bundle, with at least a defined thickness of the glass cladding material removed along a longitudinal extent L of the output fiber, beginning at the terminal portion, so as to enable core-to-core fusion splicing between the optical input arrangement and the optical output fiber, reducing core distortion at the splice point and creating a high efficiency fusion splice combiner, the thickness of the glass cladding material is gradually reduced along the defined longitudinal extent L while extending to the endface of the output fiber; and
an output optical combiner, the set of optical output fibers from the input stage applied as inputs to the output optical combiner and configured as a trunk tapered fiber bundle, the output optical combiner further comprising a system output fiber including a core region and a polymer cladding layer surrounding the core region, with the endface of the trunk tapered fiber bundle fusion spliced to the system output fiber.

19. A high efficiency optical combiner comprising a cladding-less optical input fiber including a core region a diameter $D_{in}$; and an optical output fiber defined as including a terminal portion for coupling to an endface of the cladding-less optical input fiber, the output fiber including a core region and at least one glass cladding layer surrounding the core region, wherein the core region exhibits a diameter $D_{out}$ substantially equal to the diameter $D_{in}$ of the cladding-less optical input fiber, with at least a defined thickness of the glass cladding material removed along a longitudinal extent L of the output fiber, beginning at the terminal portion, so as to enable core-to-core fusion splicing between the cladding-less optical input fiber and the optical output fiber, reducing core distortion at the splice point and creating a high efficiency fusion splice optical combiner, the thickness of the glass cladding material is gradually reduced along the defined longitudinal extent L while extending to the endface of the optical output fiber.

* * * * *